Patented Oct. 18, 1938

2,133,286

UNITED STATES PATENT OFFICE 2,133,286

ACID CALCIUM TETRAPHOSPHATE AND METHOD OF MAKING THE SAME

Augustus H. Fiske, Warren, R. I., assignor to Rumford Chemical Works, Rumford, R. I., a corporation of Rhode Island No Drawing. Application May 11, 1937,
Serial No. 142,057

5 Claims. (Cl. 23—109)

My present invention relates to a calcium or like tetraphosphate and particularly to an acid calcium tetraphosphate adapted for various uses, but notably for use in connection with food products as in the leavening of bread doughs or sponge.

As in my previous patents, I desire again to give full credit to the prior work of others of recognized standing. My previous patent group related to a sodium tetraphosphate for softening waters, and were granted currently in 1935, 1936 and 1937.

Therein I noted that Fleitmann and Henneberg had pioneered in the discovery of tetraphosphoric acid in 1846, and that such an acid was described by Roscoe and Schlorlemmer's Treatise on Chemistry, published in 1905.

Tetraphosphoric acid and the tetraphosphates, as known prior to my present invention, were purely chemical curiosities except as developed for non-edible purposes as in my water softening sodium tetraphosphates of my prior patents above referred to for use as soap savers in the cleansing industries and the like.

Since the commercial exploitation of the products of my patents aforesaid, tetraphosphoric acid has become available commercially. This is in the nature of a rather syrupy liquid, which, upon analysis, I found usually contains approximately 17% of pyro or like phosphates. In my copending application Serial No. 142,058 I described and claimed a process for purifying this commercial tetraphosphoric acid and the new pure acid as such produced by it.

My concurrent research with both the commercial tetraphosphate and my own purified tetraphosphate, led me to contemplate the use of one of them to give an acid calcium tetraphosphate of potentially high commercial value.

In my said researches I studied all of the indicated basic salts of such a tetraphosphoric acid in view of the possibility of producing commercially a useful calcium tetraphosphate. The neutral calcium salt, as precipitated from solution by Fleitmann and Henneberg in their chemical research above acknowledged, never found practical placement in the industrial arts. When I first produced the acid calcium tetraphosphate, I realized that I had made a salt which, as far as I now know, had not even been previously described.

This acid salt has distinct practical possibilities and uses apparently unforseen due to the fact that it could not previously have been produced commercially. In following through with my concept, I produced five of these possible salts of calcium containing from one to five equivalent molecules of calcium as follows:

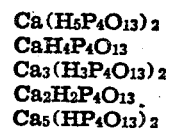

$Ca(H_5P_4O_{13})_2$
$CaH_4P_4O_{13}$
$Ca_3(H_3P_4O_{13})_2$
$Ca_2H_2P_4O_{13}$
$Ca_5(HP_4O_{13})_2$

The addition of the proportion of one-half an atom of calcium was a failure. It gave a sticky syrupy material which was of no apparent particular commercial value even today, but may have important values on further research. I also made materials having the proportion of one atom and three atoms of calcium to two molecular proportions of the tetraphosphoric radical, but found them unpromising according to present conditions. I also made a fourth material containing two atoms of calcium per one molecular portion of the tetraphosphate radical and found it to be very satisfactory and to have proper physical properties available as an immediate commercial product. From this fourth I obtained an acid calcium tetraphosphate, which is a white pulverulent material and has a neutralizing value of 66% of its weight of bicarbonate of soda.

To check my result further I added the calculated proportion of another half an atom of calcium to the tetraphosphate radical and obtained a somewhat similar material but with a neutralizing value of approximately 50% of its weight of bicarbonate of soda.

Checking my then research further by the further addition of calcium I obtained correspondingly new materials but of progressively lower and lower neutralizing value. This for current commercial prospects was so significant that I felt obliged to concentrate my efforts and limited laboratory resources to the above indicated material and its commercial production.

My acid calcium tetraphosphate is prepared as follows:

I take a calculated amount of the tetraphosphoric acid and I mix with it a calculated amount of pure lime, the chemical formula of which is CaO, and since the tetraphosphoric acid requires additional water to enter into the reaction I add a calculated amount of water to the other two reactants.

My formula for making my product is 20 parts by weight of commercial concentrated tetraphosphoric acid containing approximately 85% phosphoric anhydride ($P_2O_5$). I mix this with 12 parts by weight of water. I then mix in 6.612 parts by weight of pure commercial chemical lime. After thoroughly mixing a reaction takes place producing a white pulverulent substance which on cooling, by allowing to stand for about forty-eight hours, becomes dry and can be easily granulated and powdered. The reaction for preparing my material is as follows:

$$H_6P_4O_{13} + 2CaO + 3H_2O = Ca_2H_2P_4O_{13}5H_2O$$

This white material is my new substance and it has the formula $Ca_2H_2P_4O_{13}5H_2O$.

This material can be made in commercial quantities and as stated above is a new substance never having been described in the chemical literature so far as I know.

My acid calcium tetraphosphate is an exact chemical compound made in an exact manner, with exact proportions, under exact conditions and produces a material of exact chemical analysis with definite physical and chemical properties which are of definite commercial value. The other proportions of calcium used and the conditions employed by me in my experiments which were varied up to six equivalent atoms of calcium are not of definite value, or physical or chemical properties, to the best of my present knowledge. According to my experiments they gave anomalous acidities of low value, and indicated admixtures of ortho and pyro phosphate. Their neutralizing value was 25% to 35% of their weight of bicarbonate of soda which is not commercially of value for most purposes. In my opinion the excess alkalinity and the heat of reaction, together, caused hydrolysis to take place and the tetraphosphoric acid probably underwent the change as follows:

$$H_6P_4O_{13} + 2H_2O = H_4P_2O_7 + 2H_3PO_4$$

The proportions vary probably in proportion to the amount of lime present and the temperatures. The lime then probably combines with these acids forming the above compounds.

The graphic formula of the acid calcium tetraphosphate can be probably indicated as follows:

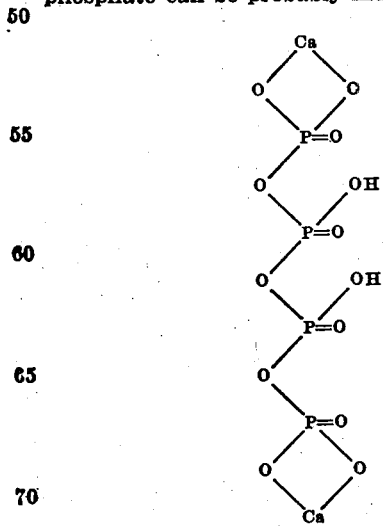

My reasoning for this formula is that the compounds tend to hydrolyze in alkaline solution, such, for instance, as an excess of lime and water, to the pyrophosphates. Therefore this reaction, written graphically, would be:

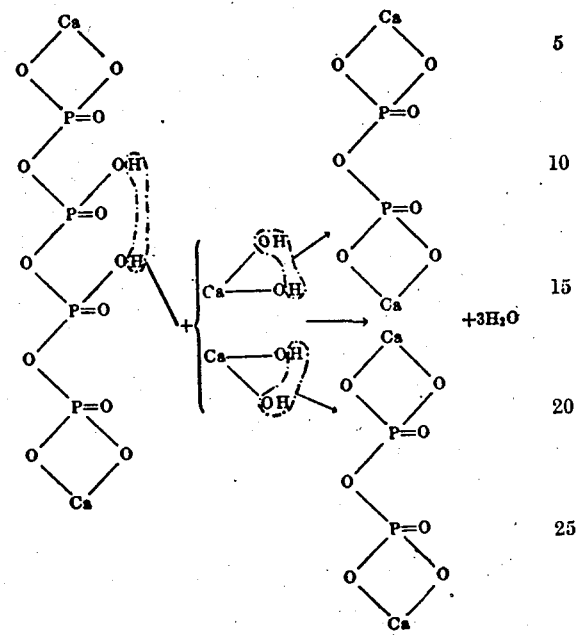

The reaction as written out would be:

$$Ca_2H_2P_4O_{13} + 2Ca(OH)_2 = 2Ca_2P_2O_7 + 3H_2O$$

Probably the molecule splits in the center between the two interior phosphorus atoms and water is split off. The CaO radical then enters where the molecule has split and water is split off each $Ca(OH)_2$ molecule. I have indicated the water molecules splitting off by the dot and dash lines in the diagram.

As indicated above, my researches indicated that a perfectly satisfactory product may be made from the commercially available tetraphosphate containing the pyrophosphate impurity, which my analyses indicate is present in about 17½%. The physical properties of the pyrophosphate and the tetraphosphate acid calcium salts are practically identical, and any slight difference resulting from such a small admixture as 17½% would not be noticed and would be immaterial.

In my research I have used quick lime (CaO) to neutralize the tetraphosphoric acid, but by modifying the conditions of the reaction slightly I can make my acid calcium tetraphosphate from hydrated or slaked lime ($CaO_2H_2$) or from calcium carbonate ($CaCO_3$) as well as from the quick lime (CaO) as they are interchangeable where calcium is to be added to an acid, all neutralizing the acid by introducing the calcium atom into the molecule, their activity being in the order named. The reactions would be:

$$H_6P_4O_{13} + 2Ca(OH)_2 = Ca_2H_2P_4O_{13} + 4H_2O$$
$$H_6P_4O_{13} + 2CaCO_3 = Ca_2H_2P_4O_{13} + 2H_2O + 2CO_2$$

I have given the formula of my acid calcium tetraphosphate as $Ca_2H_2P_4O_{13}$ but it should be noted that the material crystallizes with five molecules of water of crystallization which may be driven off by heating. The reaction would be as follows:

$$Ca_2H_2P_4O_{13}5H_2O + \text{heat} \rightarrow Ca_2H_2P_4O_{13} + 5H_2O$$

By my invention I have established the neutralizing peak for acid calcium tetraphosphate which is a salt of great value and capable of immediate utilization in various combinations to get new and useful results.

My experiments with my acid calcium tetraphosphate indicates that it is unexpectedly different from any calcium phosphates heretofore produced in character and performance.

What I therefore claim and desire to secure by Letters Patent is:—

1. Acid calcium tetraphosphate having as an indicated formula $Ca_2H_2P_4O_{13}$.

2. Acid calcium tetraphosphate having the property of neutralizing bicarbonate of soda.

3. White pulverulent acid calcium tetraphosphate having the property of neutralizing from approximately 25% up to approximately 66% of its own weight of bicarbonate of soda.

4. A method of producing an acid calcium tetraphosphate consisting in reacting 6.612 parts by weight of a calcium base with 20 parts by weight of tetraphosphoric acid and containing approximately 85% phosphoric anhydride, to secure a white pulverulent substance.

5. A method of producing an acid calcium tetraphosphate consisting in reacting 6.612 parts by weight of lime with 20 parts by weight of tetraphosphoric acid and containing approximately 85% phosphoric anhydride, to secure a white pulverulent substance, and in drying and pulverizing the resulting product.

AUGUSTUS H. FISKE.